(12) United States Patent
Fornage (10) Patent No.: US 9,048,693 B2
(45) Date of Patent: Jun. 2, 2015

(54) METHOD AND APPARATUS FOR DETECTING IMPAIRMENT OF A SOLAR ARRAY

(75) Inventor: Martin Fornage, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 1292 days.

(21) Appl. No.: 12/229,622

(22) Filed: Aug. 26, 2008

(65) Prior Publication Data

US 2009/0066357 A1    Mar. 12, 2009

Related U.S. Application Data

(60) Provisional application No. 60/970,430, filed on Sep. 6, 2007.

(51) Int. Cl.
  *G01R 21/00*    (2006.01)
  *H02J 3/38*    (2006.01)
  *H02S 50/10*    (2014.01)

(52) U.S. Cl.
  CPC .............. *H02J 3/383* (2013.01); *Y02E 10/563* (2013.01); *H02S 50/10* (2014.12)

(58) Field of Classification Search
  USPC .......... 702/60, 58, 81, 117, 182, 189; 714/22; 323/906
  See application file for complete search history.

(56) References Cited

U.S. PATENT DOCUMENTS

| 4,163,194 | A | | 7/1979 | Ross | |
|---|---|---|---|---|---|
| 5,669,987 | A | * | 9/1997 | Takehara et al. | 136/244 |
| 6,961,641 | B1 | * | 11/2005 | Forth et al. | 700/295 |
| 2006/0085167 | A1 | | 4/2006 | Warfield et al. | |
| 2008/0097655 | A1 | | 4/2008 | Hadar et al. | |
| 2008/0238195 | A1 | | 10/2008 | Shaver et al. | |
| 2008/0272279 | A1 | | 11/2008 | Thompson | |
| 2010/0106339 | A1 | | 4/2010 | Little et al. | |

FOREIGN PATENT DOCUMENTS

| JP | 06-311651 | | 11/1994 |
|---|---|---|---|
| JP | 2000040838 | A | 2/2000 |
| JP | 2000/166098 | A2 | 6/2000 |
| JP | 2003197945 | A | 7/2003 |
| JP | 2005-340464 | | 12/2005 |
| JP | 2005340464 | A | 12/2005 |
| WO | 2008125915A2 | A2 | 10/2008 |

OTHER PUBLICATIONS

Chou et al., 'Maximizing Efficiency of Solar-Powered Systems by Load Matching', Aug. 2004, ISLPED Publicaiton, pp. 162-167.*

(Continued)

*Primary Examiner* — Elias Desta
(74) *Attorney, Agent, or Firm* — Moser Taboada (57) ABSTRACT

An apparatus for detecting an impairment of a solar array. The apparatus comprises an impairment detection module for performing a comparison of a power production profile and at least one reference profile, wherein the power production profile and the at least one reference profile are for at least one of the solar array, at least one solar subarray of the solar array, or at least one solar panel of the solar array. The apparatus determines, based on the comparison, whether the impairment exists.

6 Claims, 7 Drawing Sheets (56) References Cited

OTHER PUBLICATIONS

Ricketts, Camille, "SolarEdge raises funds for self-adjusting photovoltaic panels," Feb. 25, 2009, Copyright 2004-2008(c) Matt Marshall. Downloaded from web site http://venturebeat.com/2009/02/25/solaredge-raises-funds-for-self-adjusting-photovoltaic-panels/ on May 1, 2009.

Garthwaite, Josie, "Israel's SolarEdge Raises $23M to Crush Shady Solar," Copyright 2009 The GigaOM Network. Downloaded from web site http://earth2tech.com/?s=solaredge on May 1, 2009.

"PowerString," Product Sheet, Copyright Act Solar 2009. Downloaded from web site http://www.actsolar.com/products/index.php#3 on May 1, 2009.

"PowerString Benefits," Product Sheet, Copyright Act Solar 2009. Downloaded from web site http://www.actsolar.com/products/benefits.php on May 1, 2009.

"PowerString Product Overview," Copyright 2009 Act Solar, Inc. Downloaded from web site http://actsolar.com/files/powerstring-pdf on May 1, 2009.

"PowerString™—Active Power Management System," Data Sheet, Copyright 2009 Act Solar, Inc. Downloaded from web site http://actsolar.com/files/powerstring-datasheet-v4.pdf on May 1, 2009.

Extended European Search Report, Application No.—EP08252888, Received on Dec. 13, 2013.

\* cited by examiner

METHOD AND APPARATUS FOR DETECTING IMPAIRMENT OF A SOLAR ARRAY

CROSS-REFERENCE TO RELATED APPLICATIONS

This application claims benefit of U.S. provisional patent application Ser. No. 60/970,430, filed Sep. 6, 2007, which is herein incorporated by reference.

BACKGROUND OF THE INVENTION

1. Field of the Invention

Embodiments of the present invention generally relate to a method and apparatus for managing a solar array, and more specifically to a method and apparatus for detecting an impairment of a solar array.

2. Description of the Related Art

Producing power from solar energy involves installing multiple solar panels on a structure (e.g., a building, a home, and the like) and transforming the sun's rays into usable power. In a solar array arrangement, multiple solar panels comprise a solar subarray, and multiple solar subarrays form the solar array. Over time, the solar panels tend to become impaired due to various factors. For example, intrusions such as physical obstructions, snow, precipitation, or dust cause impairment of the panels' productivity. Further, a faulty micro-inverter or a broken solar panel may also impair a solar array's power productivity. Accordingly, a solar array requires constant monitoring and maintenance to ensure efficient operation.

In general, detecting an impairment of a solar array can be a cumbersome and complicated task, particularly because of the number of solar panels that may be involved. It is even more complicated to identify the type of impairment (e.g., an obstruction or a broken component) without a physical inspection. For these reasons, correcting the impairment can be exceedingly difficult and time consuming. For example, in conventional systems, an administrator of the solar array needs to physically inspect each solar panel for any impairment. Further, all impairments must be physically repaired and may require some down time of the solar array, either partially or completely, in order to remove the impairment. In many situations, impairments may go undetected, or unidentified, or are generally ignored to avoid a complete solar array shut down. Left uncorrected, these impairments may damage essential equipment, such as the micro-inverters or the solar panels. At a minimum, such impairments reduce the efficiency and productivity of the solar array.

Accordingly, there exists a need for a method and apparatus to conveniently detect impairments of a solar array.

SUMMARY

Embodiments of the present invention generally relate to an apparatus for detecting an impairment of a solar array. The apparatus comprises an impairment detection module for performing a comparison of a power production profile and at least one reference profile, wherein the power production profile and the at least one reference profile are for at least one of the solar array, at least one subarray of the solar array, or at least one solar panel of the solar array. The apparatus determines, based on the comparison, whether the impairment exists.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. Further, the word "a" means "at least one", and the word "plurality" means one or more, unless otherwise mentioned.

DETAILED DESCRIPTION

Figure 1:
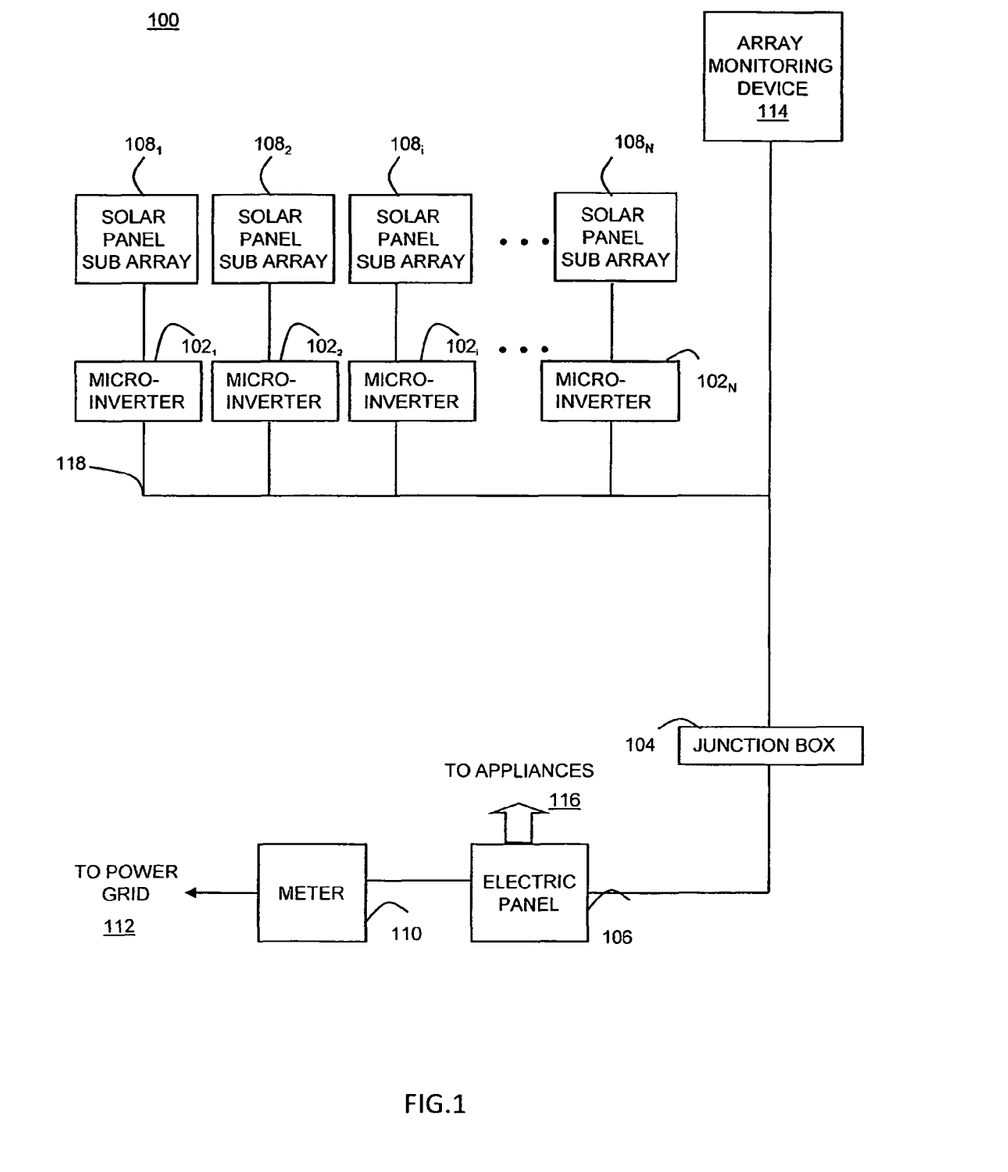
FIG. 1 is a block diagram of a solar energy system comprising apparatus for detecting an impairment of a solar array according to various embodiments of the present invention.

FIG. 1 is a block diagram of a solar energy system 100 comprising apparatus for detecting an impairment of a solar array according to various embodiments of the present invention. The system 100 includes solar subarrays $108_1$, $108_2$, $108_3$, $108_4$ ... $108_n$, hereinafter referred to as solar subarrays 108, where each solar subarray 108 comprises at least one solar panel (not shown). The solar subarrays 108 comprise a solar array that is part of a solar power generation system in a home, an office building, or a standalone solar power plant. In addition to solar subarrays 108, such a solar generation system may include various building subsystems (not shown) for maintenance, security, fault alerts, and the like.

Each solar subarray 108 is coupled to an individual DC-AC micro-inverter $102_1$, $102_2$, $102_3$, $102_4$ and $102_n$, (hereinafter referred to as micro-inverters 102). The micro-inverters 102 convert the DC power generated by the solar panels of the solar subarrays 108 into AC power, which is then combined for use by a home owner or to be supplied to a power grid 112. In an alternative embodiment, each solar panel of the solar subarrays 108 is individually coupled to a micro-inverter 102 for converting the DC power generated by the solar panels to AC power. In another alternative embodiment, the solar subarrays 108 generate DC power which is combined and supplied to a single DC-AC inverter (not shown) for converting the DC power to AC power. In another embodiment, a DC-DC converter is coupled to each solar panel of each solar subarray 108 (e.g., one converter per solar panel), where the resulting power output of the DC-DC converters may be utilized as DC power or converted to AC power by a single DC-AC inverter; alternatively, the DC-DC converters may be coupled to each solar subarray 108 (e.g., one converter per solar subarray 108). In another embodiment, the DC power generated by the solar subarrays 108 may be directly utilized without any power conversion or stored for subsequent use or conversion, such as conversion to AC power.

The AC power collected from the micro-inverters 102 is supplied through an AC transmission bus 118 to a junction box 104. The junction box 104 generally connects together the outputs from all the micro-inverters 102 to form a single AC feed to an electric panel 106 for supplying appliances 116 with power. The AC transmission bus 118 further couples the produced AC power to a meter 110 for supplying the AC power, for example, to the power grid 112. While the invention is described with respect to embodiments that convert the generated DC power to AC power, those skilled in the art will appreciate that various embodiments described herein are equally applicable to systems where such a conversion may not be done (e.g., DC power storage-based systems), and all such variations are included within the scope of the present invention.

As shown in FIG. 1, the AC transmission bus 118 is operably coupled to an array monitoring device 114 for detecting an impairment of the solar array. In some embodiments, the array monitoring device 114 may be coupled to the AC transmission bus 118 via a communications network, such as the Internet. The array monitoring device 114 is configured to store one or more reference profiles for each solar subarray 108. Each reference profile depicts a baseline level of power production of a solar subarray 108 under normal operating conditions. For example, a first reference profile may depict normal power production on a clear summer day, and a second reference profile may depict normal power production on a cloudy summer day. Additionally and/or alternatively, the array monitoring device 114 may generate the reference profiles, and may generate and/or store one or more reference profiles for each of the solar panels of the solar subarrays 108 and/or for the entire solar array. In alternative embodiments, the array monitoring device 114 may access reference profiles (e.g., reference profiles for one or more solar panels, one or more solar subarrays 108, and/or the entire solar array) stored on a separate device.

The array monitoring device 114 is additionally configured to obtain one or more power production profiles of the solar subarrays 108, where each power production profile depicts power production of a solar subarray 108 over a period of time. In some embodiments, the array monitoring device 114 may generate and/or store the one or more power production profiles; additionally and/or alternatively, the array monitoring device 114 may generate and/or store one or more power production profiles for one or more solar panels and/or for the entire solar array. In some embodiments, the array monitoring device 114 may access power production profiles (e.g., power production profiles for one or more solar panels, one or more solar subarrays 108, and/or the entire solar array) stored on a separate device.

The array monitoring device 114 compares the one or more power production profiles of the solar subarrays 108 against one or more corresponding reference profiles to identify an occurrence of an impairment of the solar array. Possible causes of an impairment of the solar array include a buildup of precipitation on a solar panel, a faulty micro-inverter, an intrusive structure or body (e.g., shadows, clouds, other buildings) blocking a solar panel from the solar energy, or a broken solar panel, among other defects. At a minimum, the array monitoring device 114 detects a change in performance of a solar subarray 108 resulting from an impairment. Additionally and/or alternatively, the array monitoring device 114 may obtain and compare power production profiles and reference profiles of one or more solar panels and/or for the entire solar array to identify an impairment of the solar array. In alternative embodiments, the array monitoring device 114 may perform additional processing of power production profiles to identify a particular type of impairment, as further described below. Additionally and/or alternatively, the array monitoring device 114 may generate one or more reports of power production over time for one or more solar panels, one or more solar subarrays 108, and/or the entire solar array.

In some embodiments, the array monitoring device 114 may obtain power production data for one or more solar panels, one or more solar subarrays 108, and/or the entire solar array, by sampling the AC transmission bus 118 voltages or from the micro-inverters 102. Additionally and/or alternatively, power production data may be obtained by the micro-inverters 102 and provided to the array monitoring device 114. In some embodiments, the array monitoring device 114 may obtain power production data directly from one or more solar panels, one or more solar subarrays 108, and/or the entire solar array. In some embodiments, power production data may be obtained by a local device coupled to the solar array and transmitted to the array monitoring device 114 via a communications network, such as the Internet. Power production data may be utilized for generating one or more reference profiles, generating one or more power production profiles, and/or generating one or more power production reports for one or more solar panels, one or more solar subarrays 108, and/or the entire solar array.

Figure 2:
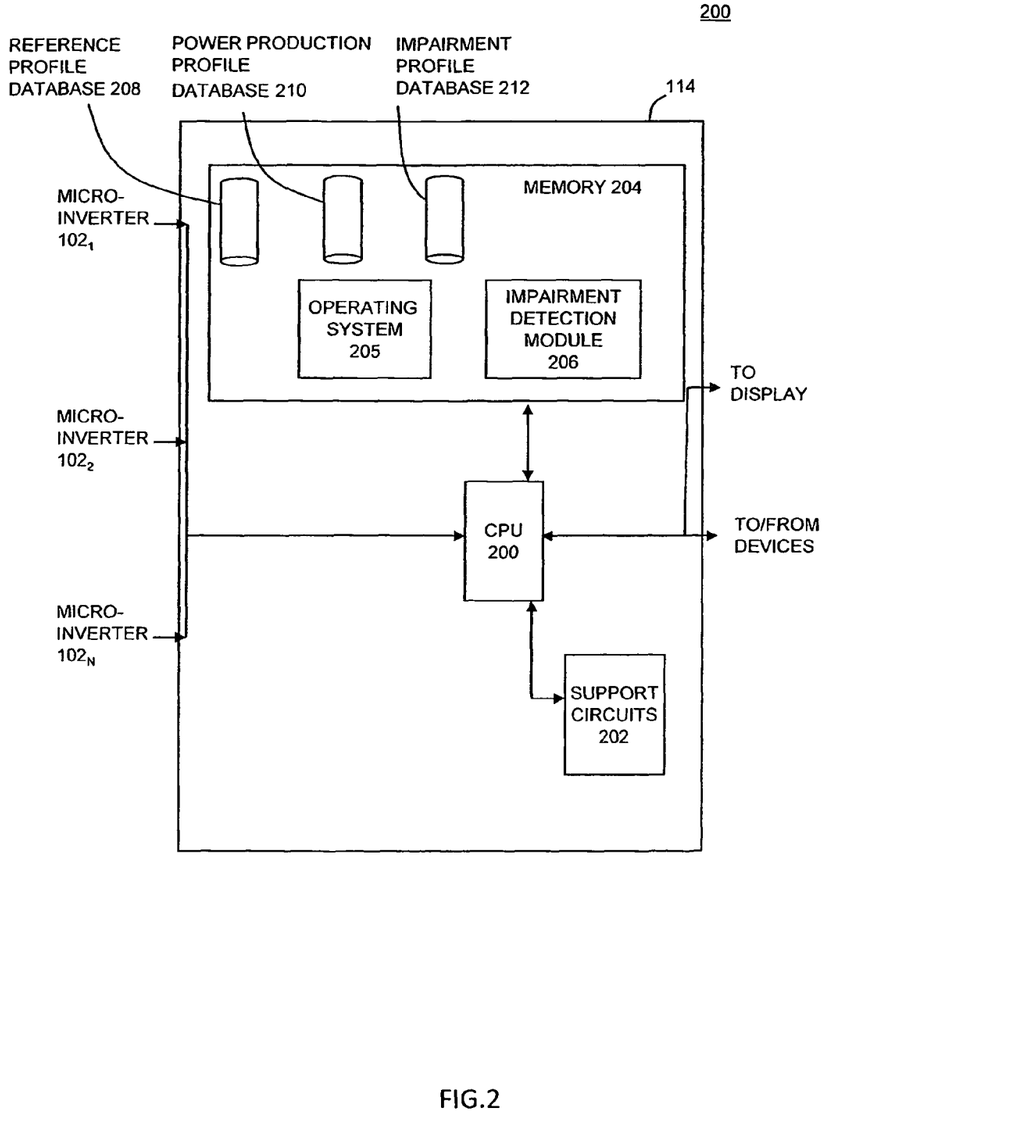
FIG. 2 is a block diagram of an array monitoring device for detecting impairment of a solar array according to various embodiments of the present invention.

FIG. 2 is a block diagram of an array monitoring device 114 for detecting an impairment of a solar array according to various embodiments of the present invention. As shown in FIG. 1, one or more micro-inverters 102 are coupled to the array monitoring device 114.

The array monitoring device 114 includes a CPU 200, various support circuits 202, a memory 204, an impairment detection module 206, a reference profile database 208, and a power production profile database 210. The CPU 200 may include one or more microprocessors known in the art. The support circuits 202, which support operation of the CPU 200, may include cache, power supplies, clock circuits, data registers, I/O interfaces, and the like. The memory 204 may comprise random access memory, read only memory, removable memory, flash memory, and various combinations of these types of memory. The memory 204 is sometimes referred to as main memory and may in part be used as cache memory or buffer memory. The memory 204 includes an operating system 205. The operating system 205 is any commercially available operating system (e.g., the WINDOWS operating system by MICROSOFT, UNIX operating system, LINUX operating system, MACINTOSH operating system, and the like).

The memory 204 also stores various software packages, including the impairment detection module 206. In alternative embodiments, the impairment detection module 206 may be implemented in hardware or a combination of hardware and software. The memory 204 also stores various relational databases including a reference profile database 208 and a power production profile database 210. The reference profile database 208 stores one or more reference profiles for the solar panels of a solar array, the solar subarrays of a solar array (such as the solar subarrays 108), and/or the entire solar array. The power production profile database 210 stores one or more power production profiles for the solar panels of the solar array, the solar subarrays of the solar array (such as the solar subarrays 108), and/or the entire solar array.

According to one embodiment, the impairment detection module 206 has access to the reference profile database 208 and the power production profile database 210. The impairment detection module 206 is configured to access one or more reference profiles of a solar subarray 108 from the reference profile database 208, analyze the corresponding power production profile from the power production profile database 210, and determine whether an impairment of the solar subarray 108, and thus an impairment of the solar array, exists. According to one embodiment, the power production profile is compared to one or more reference profiles to determine whether there are any statistically significant differences between current power production of the solar subarray 108 and normal solar power production of the solar subarray 108 under similar conditions. Although slight differences between the power production profile and the reference profiles may be attributed to the dynamic nature of weather and the sun, statistically significant differences between the profiles indicates the presence of an impairment.

Optionally, the impairment detection module 206 may be further configured to perform additional operations. According to one embodiment, the impairment detection module 206 is further configured to identify the type of impairment of a solar subarray 108. When a power production profile of the solar subarray 108 is compared to a corresponding reference profile, certain characteristics of the difference between the profiles (e.g., a slope, a time of day, a magnitude or a direction of solar power production, and the like) may indicate a specific type of impairment. For example, if a power production profile shows a decrease from normal production to almost zero production and, subsequently, an increase back to normal production, an object may be blocking the sun at a particular time of day (e.g., a shadow traverses the solar subarray 108). Once an impairment is detected, the impairment detection module 206 may further analyze the power production profile to determine a particular impairment, (e.g., slope detection, filtering, rate of change, and the like). According to another embodiment, certain types of impairments may have their own reference profiles (i.e., a profile showing average solar power production in the presence of the suspected impairment) for comparison with the power production profile. Such impairment profiles may be stored in an impairment profile database 212 of the array monitoring device 114 and may be accessed by the impairment detection module 206 for comparison to the power production profile. Based on such comparisons, the impairment detection module 206 may identify a particular type of impairment.

Additionally and/or alternatively, the impairment detection module 206 may be further configured to process power production data of a solar subarray 108 and generate a report of power production of the solar subarray 108 over a period of time. Existing power production profiles for the subarray 108 may be utilized in generating the report. In another embodiment, the impairment detection module 206 may be further configured to generate an alert (e.g., a message) upon detecting an impairment of a solar array. In yet another embodiment, the impairment detection module 206 may be further configured to automatically correct a detected impairment; for example, the impairment may be corrected by adjusting the Maximum Power Point (MPP) of one or more solar panels of a solar array to optimize the solar power production of the solar array.

In alternative embodiments, the impairment detection module 206 may obtain power production profiles and reference profiles for one or more solar panels of a solar array, and/or for the entire solar array, from the power production profile database 210 and the reference profile database 208, respectively. The impairment detection module 206 may then compare the power production profiles and the reference profiles to identify whether an impairment of the solar array exists and, upon determining that an impairment exists, generate an alert. The impairment detection module 206 may further compare the power production profiles to one or more impairment profiles to identify a particular cause of an impairment, and may automatically correct the impairment. The impairment detection module 206 may additionally process power production data for one or more solar panels, and/or the entire solar array, and generate a report of power production over time for the one or more solar panels, and/or the entire solar array.

Figure 3:
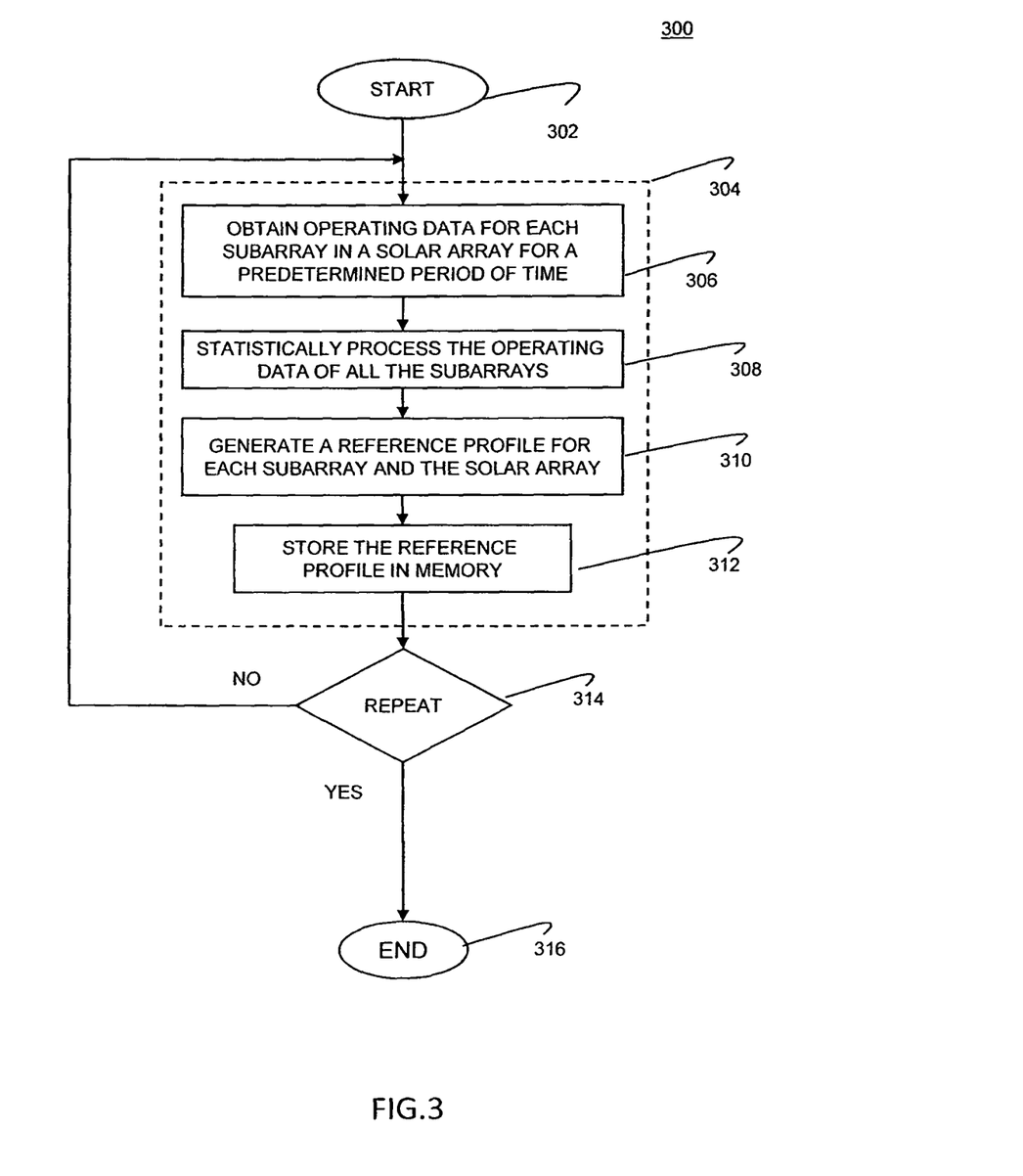
FIG. 3 is a flowchart illustrating a method for generating and storing reference profiles for each solar subarray of a solar array according to various embodiments of the present invention.

FIG. 3 is a flowchart illustrating a method 300 for generating and storing reference profiles for each solar subarray of a solar array according to various embodiments of the invention. Additionally and/or alternatively, the method 300 may be utilized to generate and store reference profiles for each solar panel of a solar array, and/or for the entire solar array. The method 300 starts at step 302 and proceeds to an initialization process 304. The initialization process 304 includes, at step 306, obtaining operating data for each solar subarray of a solar array over a predetermined period of time. The operating data may include, for example, average or usual power production data of each solar panel of a solar subarray under certain conditions over a specified period of time. At step 308, the operating data is statistically processed; for example, for each solar subarray, the operating data for all solar panels of the solar subarray may be averaged. At step 310, a reference profile for each solar subarray of the solar array is generated using the processed operating data. The reference profiles so generated are stored at step 312. The profiles may be stored, for example, in internal memory (e.g., the memory 204) or on an external data storage apparatus (e.g., an optical disk, a flash drive, a data server, and the like).

The method 300 proceeds to step 314 at which a decision is made whether to repeat the initialization process 304 and generate another reference profile for each solar subarray of the solar array. For example, additional reference profiles may be different seasons. If the initialization process 304 should be repeated (option "YES"), the method 300 returns to step 306. If the initialization process 304 should not be repeated (option "NO"), the method 300 ends at step 316.

Figure 4:
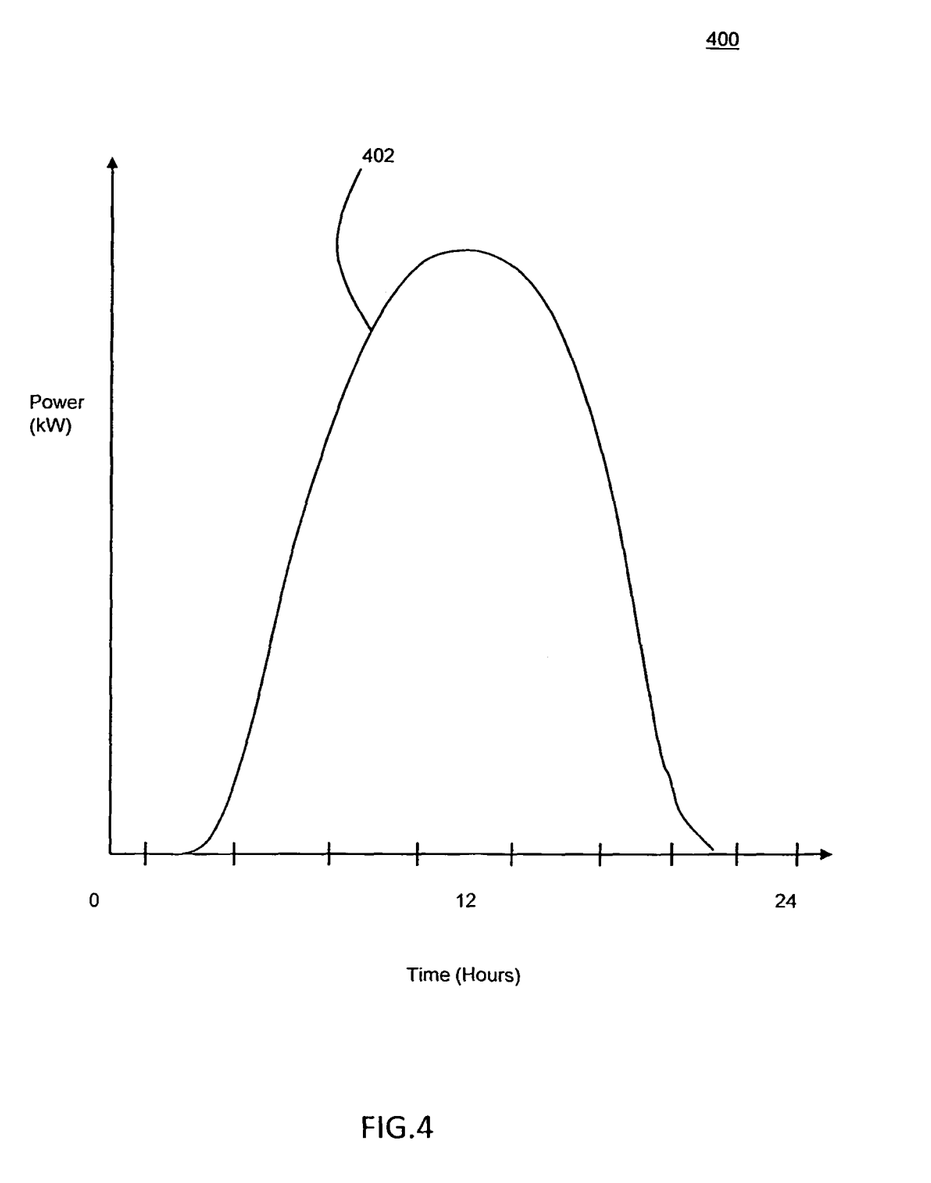
FIG. 4 is a graph illustrating a reference profile of a solar subarray generated according to various embodiments of the present invention.

FIG. 4 is a graph illustrating a reference profile 400 of a solar subarray generated according to various embodiments of the present invention. In FIG. 4, the graph 400 represents processed power production data of the solar subarray on the Y-axis and time on the X-axis to reveal a profile 402. As described above, reference profiles, such as the reference profile 402, may be generated under various weather conditions (e.g., sunny summer day, clear winter day, cloudy fall day, rainy spring day, and the like) and/or specific impairments (e.g., faulty micro-inverter, cloud, building shadow, and the like). FIG. 4, specifically, illustrates data reference profile generated on a normal clear summer day (i.e., under ideal operating conditions). The profile 402 indicates that the particular solar subarray begins generating power around dawn, peaks at about noon, and stops around dusk.

In another embodiment, the reference profiles may be generated based on estimates of an "ideal" profile under given conditions. For example, overall power production and/or peak power production values should generally be lower on a winter day than a summer day. Moreover, the overall power production time range should be shorter on a winter day as opposed to a summer day due to shortened periods of daylight in the winter. Thus, for solar array locations that are distant from the equator, on a normal clear winter day, the graph 400 may have the same general parabolic shape as that of a clear summer day, but with lower power production. Accordingly, the reference profile for a summer day may be adjusted (e.g., scaled with a shortened power production time range) to form a reference profile for a clear winter day without creating a new reference profile by the method 300.

Figure 5:
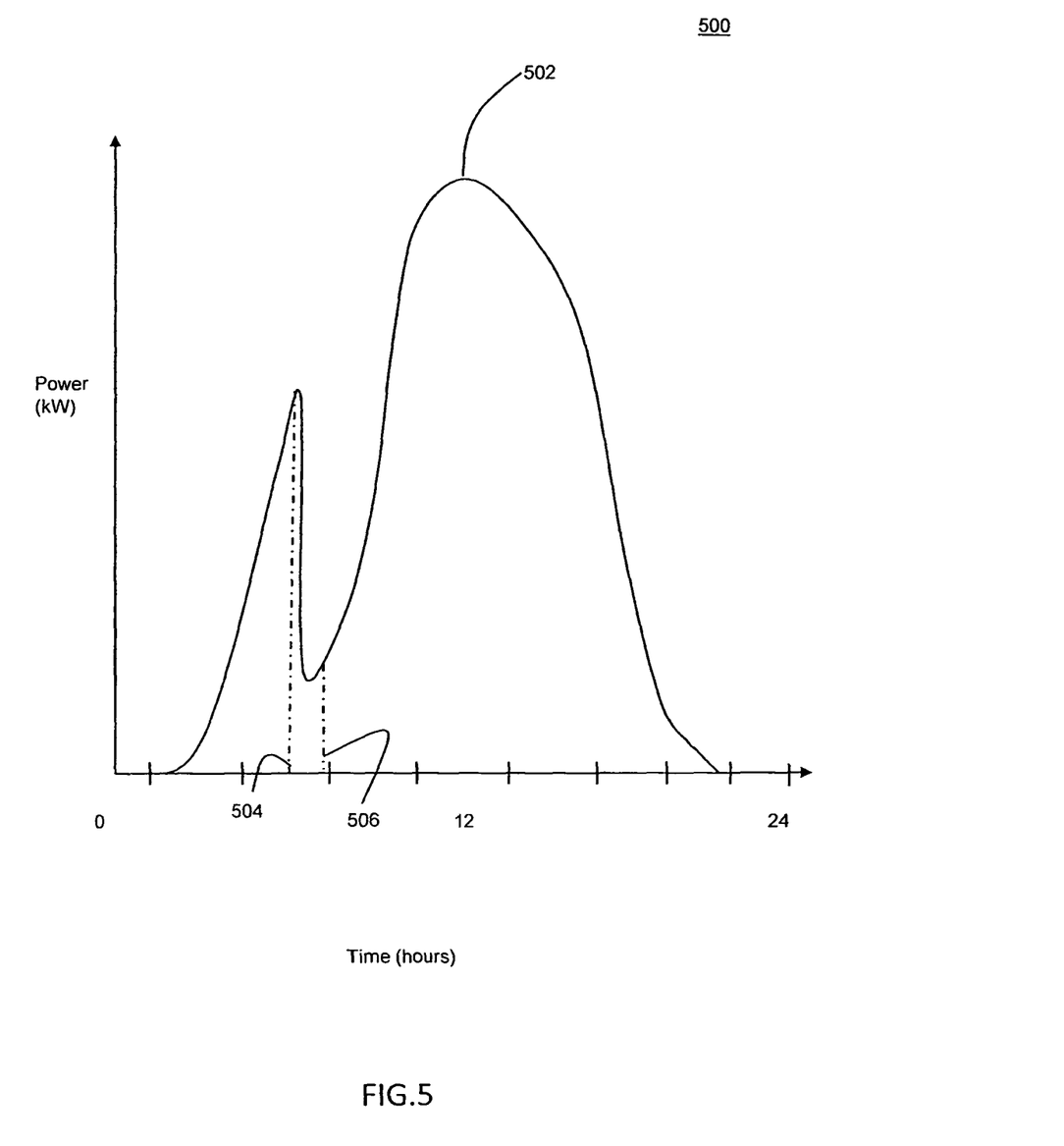
FIG. 5 is a graph illustrating a power production profile of a solar subarray generated according to various embodiments of the present invention.

FIG. 5 is a graph illustrating a power production profile 500 of a solar subarray according to various embodiments of the present invention. The graph 500 represents the power generated by the solar subarray on the X-axis and time on the Y-axis to reveal a profile 502. In particular, the graph 500 depicts a power production profile 502 generated on a clear summer day.

FIG. 5, specifically, illustrates a reduction in power production at about a point 504 and an increase in power production starting at about a point 506. When compared to the reference profile 402 for the clear summer day illustrated in FIG. 4, the reduction in the power production of the power production profile 502 can be seen to be statistically significant, thereby indicating an impairment of the solar subarray. The reduction in power production seen in the power production profile 502 may be caused by a shadow (e.g., a tree has grown proximate the solar subarray) passing over the solar subarray on a clear summer day during the time of day denoted by the X-coordinates of the points 504 and 506.

Figure 6:
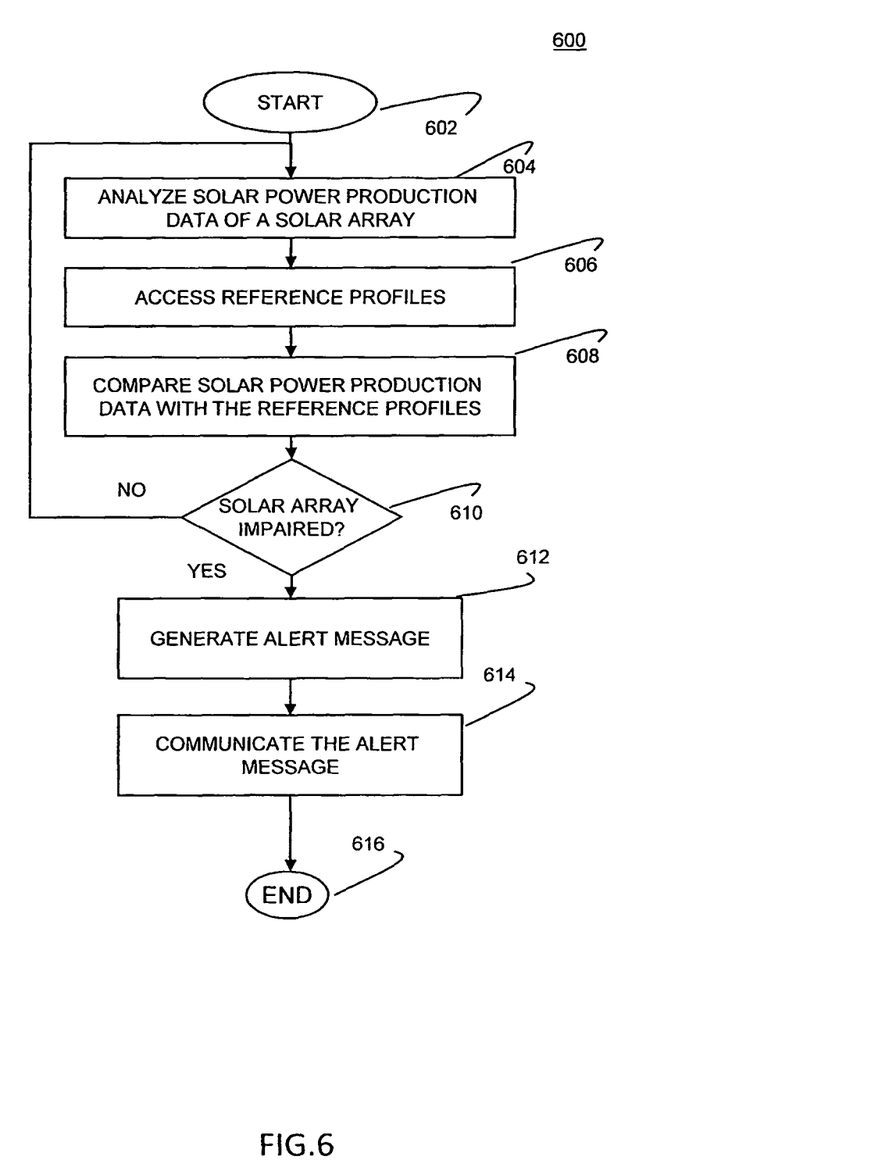
FIG. 6 is a flowchart illustrating a method for detecting an impairment of a solar array according to various embodiments of the present invention.

FIG. 6 is a flowchart illustrating a method 600 for detecting an impairment of a solar array according to various embodiments of the present invention. The method 600 starts at step 602, and proceeds to step 604, where power production data of a solar subarray of a solar array is analyzed. In alternative embodiments, the power production data of one or more solar panels of the solar array, or of the entire solar array, may be analyzed. The analysis may include generating a power production profile; alternatively, the power production profile may be generated by another routine and accessed by method 600.

At step 606, reference profiles are accessed, for example by the array monitoring device 114. At step 608, the power production profile is compared with one or more reference profiles for the corresponding solar subarray (i.e., the reference profile 402 of FIG. 4 is compared with the power production profile 502 of FIG. 5). For example, statistically significant attributes of the profiles may be compared, where the attributes generally indicate a change in the pattern of power produced by the solar subarray in comparison to the reference profiles. At step 610, a determination is made as to whether an impairment of the solar subarray, and thus an impairment of the solar array, exists. If the power production profile is similar to the reference profile, it is determined that no impairment exists (option "NO"), and accordingly the method 600 returns to step 604. If, however, a statistically significant difference exists between the reference profile and the power production profile, it is determined that an impairment exists in the solar subarray (option "YES"), and the method 600 proceeds to step 612. At step 612 an alert message is generated to indicate that an impairment has been detected. At step 614 the alert message is communicated, for example to a building subsystem or a server, at step 616, the method 600 ends.

Figure 7:
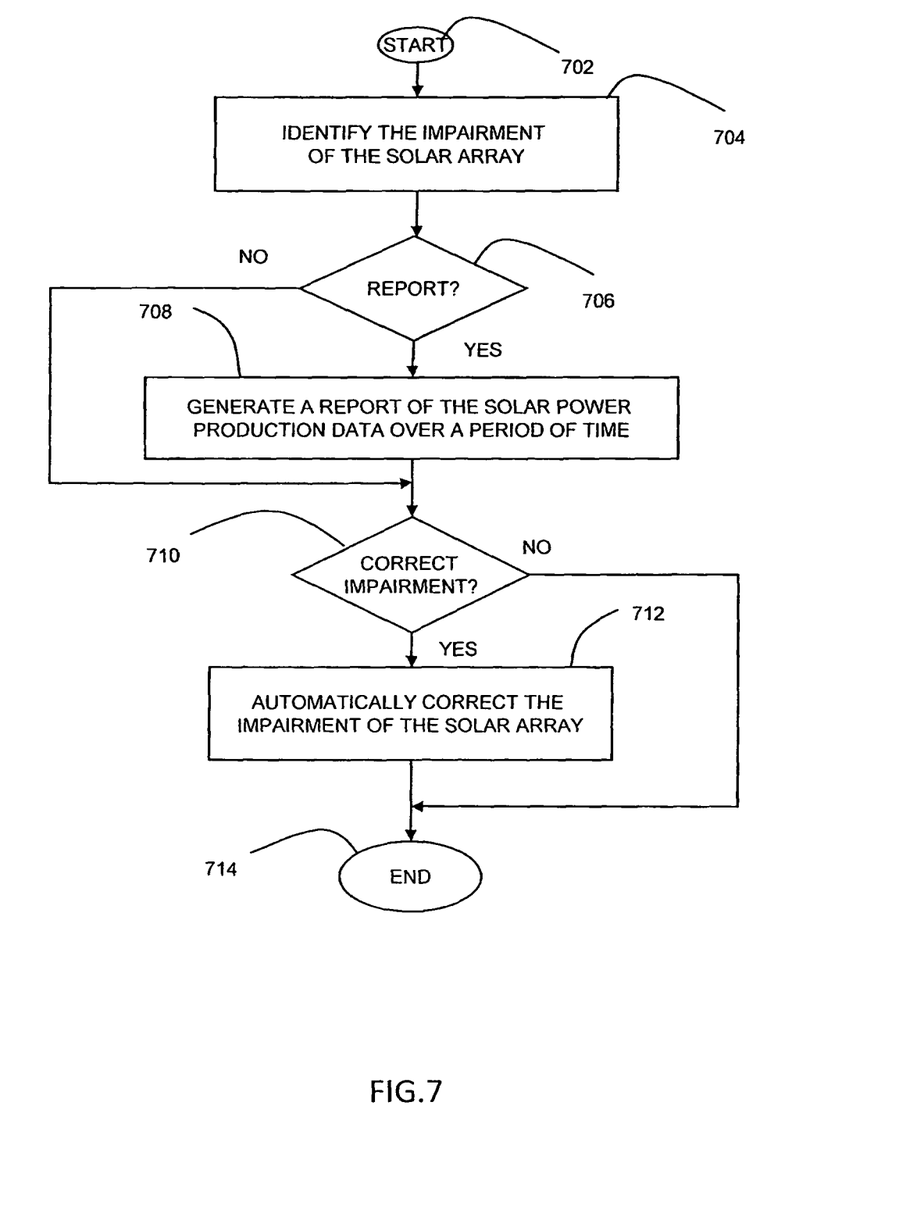
FIG. 7 is a flowchart illustrating a method for processing a detected impairment of a solar array according to various embodiments of the present invention.

FIG. 7 is a flowchart illustrating a method 700 for processing a detected impairment of a solar array according to various embodiments of the present invention. Practicing method 700 is optional once the impairment is detected. The method 700 starts at step 702 and proceeds to step 704. At step 704, the specific impairment or type of impairment is identified. The impairment may include, for example, buildup of precipitation on a solar panel, a faulty micro-inverter, an intrusive structure impeding a full view of the solar energy to the solar panel, or a broken solar panel. Each impairment may have a characteristic impairment profile, and the specific impairment may be identified by comparing the power production profile indicating the impairment to one or more impairment profiles.

At step 706, the method 700 determines whether a report of the solar power production data is to be generated. If the report is to be generated (option "YES"), the method 700 proceeds to step 708 at which the report for solar power production data for a period of time is generated; in some embodiments, existing power production profiles may be utilized in generating the report. If however, the report is not to be generated (option "NO"), the method 700 proceeds to decision step 710. At the step 710, the method 700 determines whether a correction of the impairment needs to be made. If the impairment does not need to be corrected (option "NO"), the method proceeds to step 714, at which the method 700 ends. If the impairment needs to be corrected (option "YES"), at step 712 the impairment is corrected automatically and the method ends at step 714. According one embodiment, various steps of the method 700 are implemented by the impairment detection module 206 resident in the array monitoring device 114.

The invention advantageously provides an automated process for detecting an impairment of a solar array by comparing solar power production of at least one solar panel of a solar array, at least one solar subarray of a solar array, and/or the entire solar array over a given time period to at least one reference profile. Each reference profile may depict normal and/or average power production for a typical condition or combinations of conditions; hence, if the power production data deviates from its corresponding reference profiles, an impairment of the solar array may be inferred. The invention provides methods that not only detect an impairment, but may also identify the type of impairment. Further, the invention provides for generating alert messages regarding the impairment and its probable cause, and communicating such messages to an administrator of the solar array, advantageously allowing for corrective and timely action to be taken and thereby avoiding damage to the solar array and associated loss of power production.

Further, the invention provides for automatically correcting a detected impairment, thereby greatly simplifying and shortening the repair process for various impairment conditions. Such an automatic correction feature of the present invention may not require any human intervention, thereby adding greatly to the convenience of the solar power production operation.

While the foregoing is directed to embodiments of the present invention, other and further embodiments of the invention may be devised without departing from the basic scope thereof.

The invention claimed is:

1. An apparatus for detecting an impairment of a solar array, comprising:
    an impairment detection module for performing a comparison of a power production profile and at least one reference profile and determining, based on the comparison, whether the impairment exists, wherein the power production profile and the at least one reference profile each correspond to a same at least one of the solar array, at least one solar subarray of the solar array, or at least one solar panel of the solar array, and wherein the power production profile and the at least one reference profile are graphical profiles that depict power production over time, and
    wherein the impairment detection module automatically corrects the impairment upon determining that the impairment exists.

2. The apparatus of claim 1, wherein an automatic correction comprises adjusting a Maximum Power Point (MPP) of the at least one solar panel to optimize power production of the at least one solar panel.

3. A method for detecting an impairment of a solar array, at least a portion of the method being performed by a computing system comprising at least one processor, the method comprising:
    comparing, by the computing system, a power production profile to at least one reference profile, wherein the power production profile and the at least one reference profile each correspond to a same at least one of the solar array, at least one solar subarray of the solar array, or at least one solar panel of the solar array, and wherein the power production profile and the at least one reference profile are graphical profiles that depict power production over time; and
    determining, by the computing system and from a result of the comparing, whether the impairment exists, wherein a reference profile of the at least one reference profile is generated by:
    obtaining operating data over a predetermined period of time for the at least one of the solar array, at least one solar subarray, or at least one solar panel; and
    processing the operating data to obtain the reference profile, wherein the operating data comprises at least one of an average power production or a usual power production over a specified period of time.

4. A method for detecting an impairment of a solar array, at least a portion of the method being performed by a computing system comprising at least one processor, the method comprising:
    comparing, by the computing system, a power production profile to at least one reference profile, wherein the power production profile and the at least one reference profile each correspond to a same at least one of the solar array, at least one solar subarray of the solar array, or at least one solar panel of the solar array, and wherein the power production profile and the at least one reference profile are graphical profiles that depict power production over time;
    determining, by the computing system and from a result of the comparing, whether the impairment exists; and analyzing, upon determining that the impairment exists, the power production profile to identify a cause of the impairment.

5. A method for detecting an impairment of a solar array, at least a portion of the method being performed by a computing system comprising at least one processor, the method comprising:
    comparing, by the computing system, a power production profile to at least one reference profile, wherein the power production profile and the at least one reference profile each correspond to a same at least one of the solar array, at least one solar subarray of the solar array, or at least one solar panel of the solar array, and wherein the power production profile and the at least one reference profile are graphical profiles that depict power production over time;
    determining, by the computing system and from a result of the comparing, whether the impairment exists; and automatically correcting the impairment upon determining that the impairment exists.

6. The method of claim 5, wherein the automatically correcting comprises adjusting a Maximum Power Point (MPP) of the at least one solar panel to optimize power production of the at least one solar panel.

* * * * *